3,595,933
Patented July 27, 1971

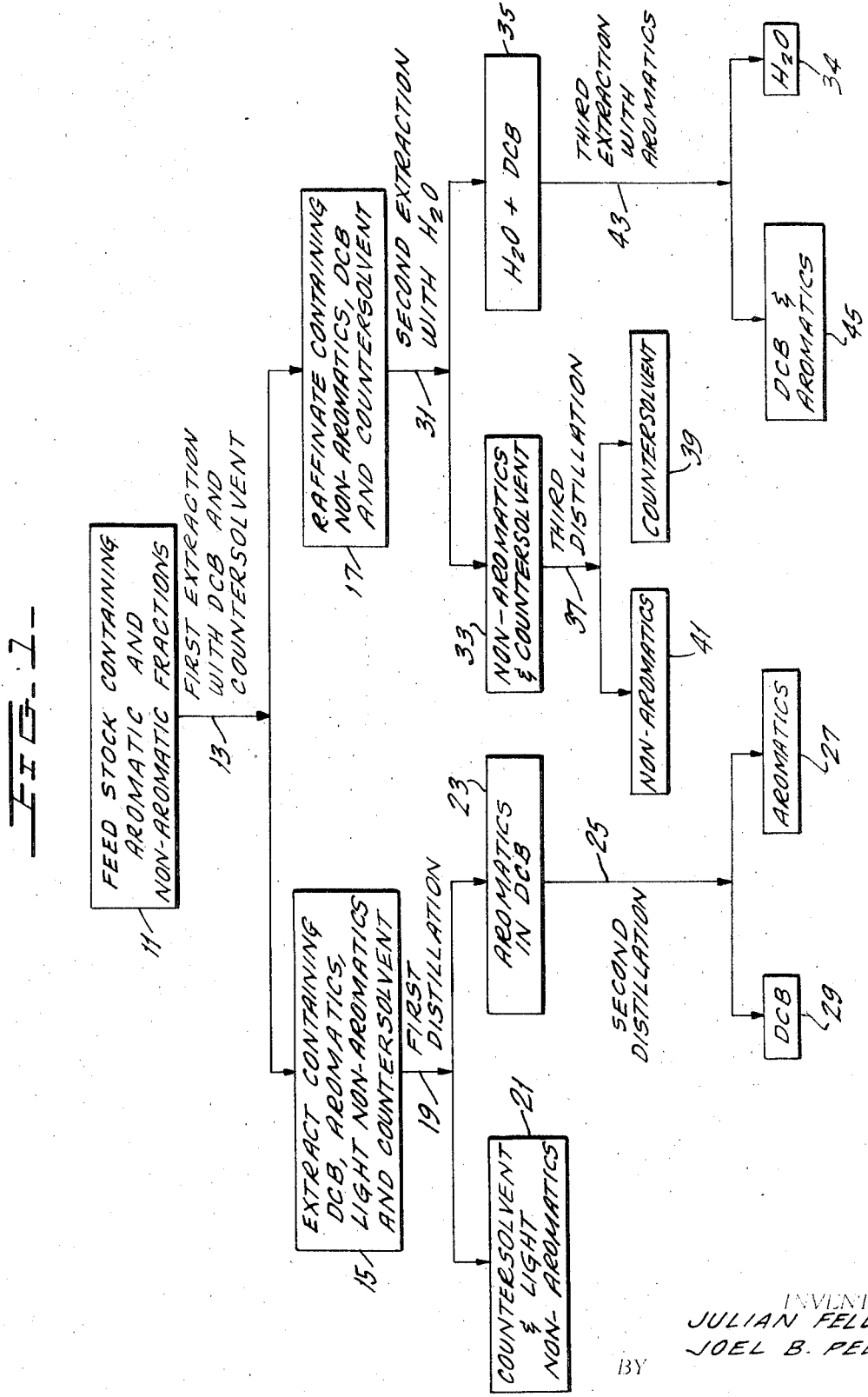

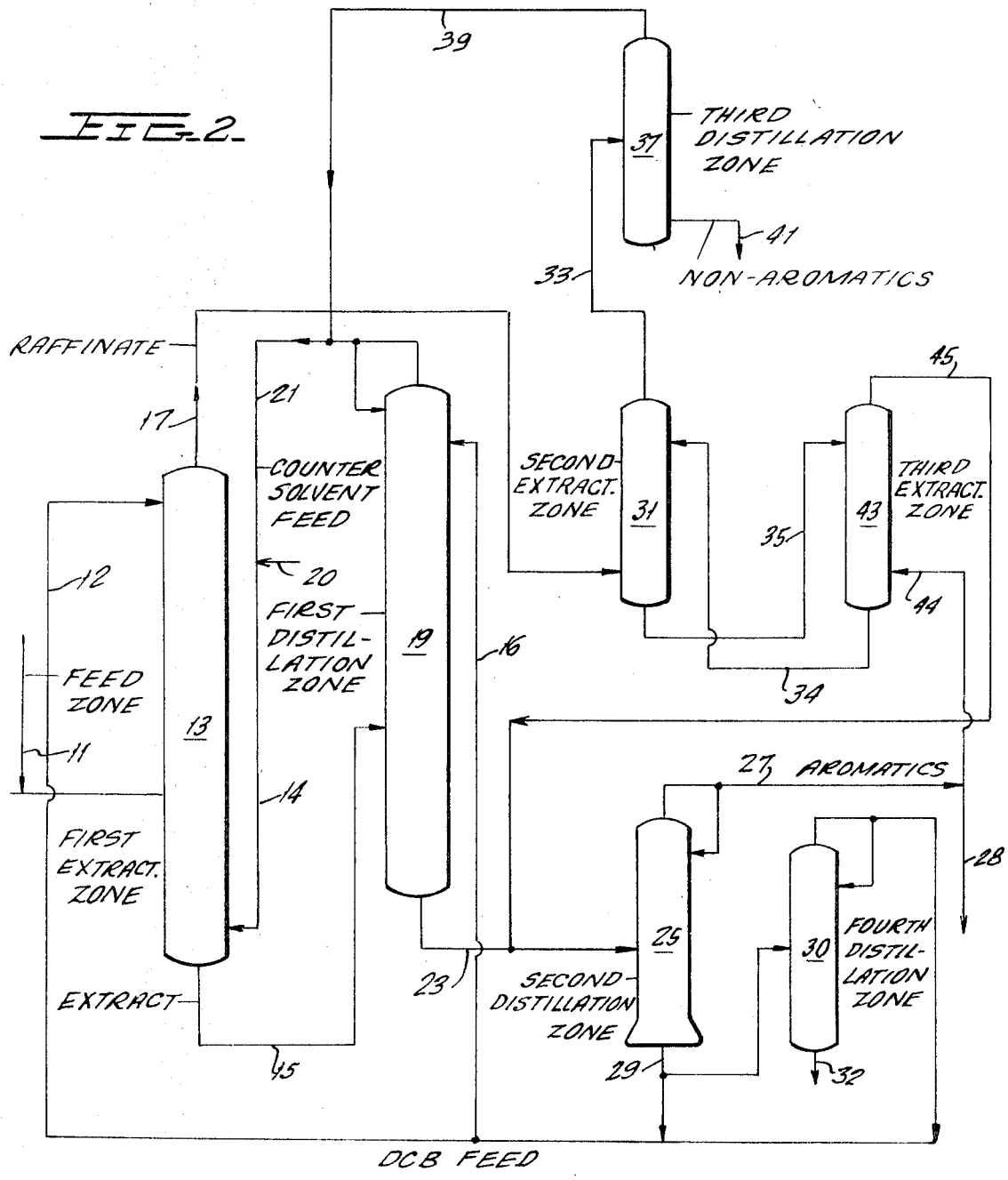

3,595,933
PROCESS FOR THE SEPARATION OF ORGANIC COMPOUNDS BY EXTRACTION WITH 1,3-DICYANOBUTANE
Julian Feldman, Cincinnati, Ohio, and Joel B. Pedigo, Wheaton, Ill., assignors to National Distillers and Chemical Corporation, New York, N.Y.
Filed July 18, 1968, Ser. No. 745,921
Int. Cl. C07c 7/10; C10g 21/20, 21/28
U.S. Cl. 260—674SE          11 Claims

ABSTRACT OF THE DISCLOSURE

A process for treating mixtures of hydrocarbons to extract therefrom the more unsaturated components, and to recover a first hydrocarbon stream rich in the more unsaturated hydrocarbons and a second hydrocarbon stream lean in the more unsaturated hydrocarbons. 1,3-dicyanobutane is employed to effect this separation utilizing one or more processing procedures such as liquid-liquid extraction, extractive distillation, extractive stripping, and the like. The extraction of aromatic from non-aromatic hydrocarbons is a preferred form of separation which may be effected by this process.

Recovery of the 1,3-dicyanobutane for use in further extractions is also provided by extraction of the 1,3-dicyanobutane with water and/or distillation of the hydrocarbon streams containing such material to effect separation and facilitate recycle thereof.

FIELD OF THE INVENTION

This invention relates to procedures for separating hydrocarbons of varying unsaturation from feed stocks incorporating the same and/or enriching such fed stocks with the predetermined hydrocarbon fractions.

DESCRIPTION OF THE PRIOR ART

Both extraction and distillation techniques have been employed in separating particular hydrocarbon species, e.g., the aromatics, from petroleum hydrocarbon mixtures. It has been very difficult to obtain substantially complete separations employing distillation techniques where the hydrocarbon mixtures have narrow boiling point ranges. Thus, for such mixtures, solvent extraction techniques have been employed. The problem with the use of solvent extraction in separating out the aromatics or other desired materials resides in the difficulty in choosing a solvent which has both a high selectivity and a high solvent capacity for the hydrocarbon species to be separated as compared with those not desired, so that the desired species may be recovered substantially free from the latter. Most selective solvents, particularly those selective for aromatic materials, will also dissolve significant proportions of other hydrocarbon species, e.g., the non-aromatics.

The following discussion relates principally to the prior attempts by extraction and distillation procedures to effect separation of aromatic hydrocarbons from non-aromatic hydrocarbons contained within petroleum feed stocks, the problems inherent in such procedures, and the techniques developed in accordance with the present invention for overcoming such problems. It should nevertheless be understood, as noted more fully hereinafter, that the present process is not restricted to the separation of aromatic hydrocarbons from non-aromatic hydrocarbons, but also includes the enrichment of hydrocarbon feed stocks with, for example, aromatic fractions, and the separation of other unsaturated hydrocarbon components from mixtures containing relatively less unsaturated hydrocarbons.

A number of materials have been described as selective solvents for the extraction of aromatic hydrocarbons from mixtures of aromatic and non-aromatic fractions. For example, U.S. Pat. No. 2,441,827 to McKinnis, granted May 18, 1949, discloses the use of nitriles or organic cyanides, broadly, for such purpose. Such solvents are not, however, capable of effective selective separation of aromatics from petroleum feed stocks, employing the simple extraction operation described in the McKinnis patent.

More recently, it has been proposed to employ 1,3-dicyanobutane (2-methyl glutaronitrile) as an extractive solvent for the separation and purification of hydrocarbons having similar boiling point ranges from mixtures thereof. The direct extractive distillation of petroleum feed stocks to which such solvent has been added is disclosed, for example, in Belgian Pat. No. 676,010 granted Feb. 28, 1966, and owned by the assignee of the present invention.

The separation of, for example, aromatic hydrocarbons from such feed stocks cannot, as a rule, be effected in a single process step, particularly in those cases in which hydrocarbon oil fractions produced by cracking are used as the feed material to be separated. The presence of various unsaturated compounds in the cracked feed stocks results in complications during extraction, e.g., polymerization and/or condensation reactions, which form gum-like products which may interfere with and terminate the processing operation. Moreover, separation of the unsaturates may be incomplete or may serve to contaminate the extract portion. Hence, it has been found that the extractive distillation alone of hydrocarbon mixtures incorporating dicyanobutane results in only the partial separation of various petroleum fractions and is, therefor, frequently inadequate for commercial purposes.

The use of sulfolane as a selective extractant, either alone or in conjunction with countersolvents to improve the selectivity of separation, has also been proposed in the literature. See Deal et al., Petroleum Refiner, September 1959, p. 185 et seq. Several drawbacks are, however, associated with the use of sulfolane as a selective solvent in hydrocarbon fractionation processes. For example, in conventional solvent extraction processes, an extract phase containing the more readily soluble component is recovered by treating the starting mixture with the selective solvent and using a liquid-liquid extraction process. The solvent is thereafter recovered from the exrtract as the bottoms in a distillation operation. Because of the fact that sulfolane readily degrades at its atmospheric boiling point, a steam-stripping step requiring sub-atmospheric pressure must be used to separate the sulfolane from the remainder of the extract phase.

Sulfolane which has been thus separated, and which is substantially free from dissolved material, has a relatively large water content, for example, more than 5%. Although sulfolane is capable of containing significant amounts of water and may be recycled for further extraction withoutt he removal of all traces of water therefrom, the presence of "significant" amounts of water may result in a reduction of the dissolving power thereof (see Kosters et al. U.S. Pat. No. 3,210,369). Such decrease in efficiency may thus necessitate the use of relatively high ratios of solvent to feed stock mixtures, or the like.

Other disadvantages associated with the use of sulfolane are that it readily degrades at its atmospheric boiling point and has a high freezing point, 82° F., the latter necessitating steam tracing of the lines and equipment carrying the pure solvent to prevent freezing thereof. Finally, the use of high temperatures and/or high vacuums in the separation of the dissolved components from the sulfolane results in high capital costs, due to large diameter, thick walled distillation columns, and large energy requirements.

It is, accordingly, among the objects of the present invention to provide an improved, commercially acceptable extractive distillation process for the separation of hydrocarbons of varying unsaturation, which process may provide efficient, highly selective separations of, for example, aromatic and non-aromatic fractions of petroleum feed stocks and yet which is not subject to the noted deficiencies of previously proposed techniques employing sulfolane or similar materials as selective extractant media.

SUMMARY OF THE INVENTION

The present invention effects the separation of hydrocarbons of varying unsaturation, particularly aromatic and non-aromatic hydrocarbons, from feed stocks incorporating the same and/or enriching such feed stocks or other materials with the aromatic or other predetermined hydrocarbon fractions thus separated. Such results are achieved by a unique combination of sequential and/or simultaneous processing steps which provide the selective separation desired. In accordance therewith, a hydrocarbon mixture of aromatic and non-aromatic hydrocarbons is initially countercurrently contacted with liquid 1,3-dicyanobutane and a countersolvent slightly soluble in the dicyanobutane to selectively dissolve the aromatics therein and form an extract phase comprising the dicyanobutane, aromatics and countersolvent, and a raffinate phase incorporating the non-aromatic constituents, a further portion of the dicyanobutane, and a small amount of countersolvent. The extract and raffinate phases thus formed are then separated, e.g., by settling, the extract being passed to a first distillation zone where the countersolvent is stripped therefrom. The desired aromatic constituents in the extract are thereafter recovered by passing the dicyanobutane-aromatic fraction mixture recovered from the first distillation zone to a second distillation zone, the aromatics being recovered in the overhead therefrom.

The remainder of the dicyanobutane solvent and the countersolvent utilized in the initial extraction are recovered from the raffinate phase formed therein by subjecting the raffinate to a water wash in a second extraction zone to form an aqueous phase containing the dicyanobutane and water, and an organic phase containing the non-aromatic hydrocarbon fraction and the countersolvent, and then separating the aqueous from the organic phase. The aqueous phase may thereafter be extracted within a third extraction zone with an aromatic cut in which the dicyanobutane is soluble to thereby extract the dicyanobutane into the organic phase, after which the latter may be conventionally fractionated and recovered for further use.

Precise separation of the aromatic from the non-aromatic constituents of the initial mixture may thus be effected, the aromatics dissolving in the dicyanobutane solvent, and the countersolvent partially dissolving within the DCB-aromatic solution to further reduce the solubility therein of the higher boiling, non-aromatic constituents. Employing such a composite extracting agent, and using the successive plural extraction, and distillation and/or stripping operations indicated, it is possible to displace substantially all of the less volatile non-aromatics from the dicyanobutane-aromatic phase, effect separation and recovery of each of the constituents of the latter, and additionally separate and recover any DCB as well as the countersolvent together with other volatile non-aromatics remaining in the raffinate from the initial extraction for further use. Moreover, the sequential separation and recovery operation of the present invention may be carried out without the use of vacuum or steam distillation techniques and without purification or concentration of the extractive solvent after recovery, expedients which are necessary in the extraction of aromatic fractions employing sulfolane and similar selective solvents.

The present process may be carried out in accordance with the various embodiments described hereinafter and shown in the accompanying drawings, in which:

FIG. 1 is a schematic flow sheet of a preferred embodiment of the sequential separation and recovery operations of the process of the invention; and FIG. 2 is a schematic block diagram of one form of apparatus which is, preferably, utilized in carrying out the preferred technique of FIG. 1 of the drawings.

In the following description, the abbreviation "DCB" has been employed, as a matter of convenience, to designate the 1,3-dicyanobutane extractive solvent employed therein; similarly, the term "extracting agent" has been utilized to identify the composite DCB-countersolvent mixtures which are so useful. Moreover, it is intended that all parts and percentages specified hereinafter are given by weight unless otherwise indicated.

In accordance with the preferred embodiment of the present invention (refer initially to FIG. 1), a hydrocarbon feed stock 11 containing aromatic and non-aromatic fractions is initially contacted, at 13, with the DCB solvent and an appropriate countersolvent to form an extract phase 15 and a raffinate phase 17 which may be readily separated from one another. The extract phase contains all of the aromatic constituents of the initial mixture, substantially all of the DCB solvent and the bulk of the countersolvent along with small amounts of the more volatile non-aromatics. The raffinate phase contains almost all of the non-aromatic constituents, in admixture with minor proportions of the DCB and countersolvent materials.

The extract phase is thereafter subjected to a first distillation 19 to separate or strip the counter solvent 21 and any other light hydrocarbons therein from a mixture 23 of the aromatic fraction in the DCB solvent. The countersolvent is thus recovered while the mixture of the aromatic constituents in the DCB solvent is subjected to a second distillation 35 to separate an aromatic stream 27 from the DCB stream 29.

While recovering the aromatic fraction as aforesaid, the raffinate 17 is treated to separate the non-aromatics therein from the minor proportions of DCB and countersolvent, and to rcover the latter materials for further use as by recycle or the like. Initially, the raffinate is subjected to a water wash or a second extraction 31 to separate an organic phase 33 containing the non-aromatic and residual countersolvent from an aqueous phase 35 containing the residual DCB in water. The stream containing the non-aromatic fraction may thereafter be subjected to a third distillation 37 to strip off the countersolvent 39 admixed with volatile non-aromatics from the bulk of the non-aromatics 41. Finals, the aqueous phase 35 is subjected to a third extraction 43 with an aromatic cut in which the DCB is soluble to dissolve the same and effect separation of an organic phase 45 containing the DCB in the aromatic extractant, and a water phase 34.

It will be undrstood that such preferred embodiment of the present process as well as the alternative modes described hereinafter, may either be carried out batch-wise or continuously, continuous operation being preferred. In the latter instance, the various product streams separated are conveniently recycled for further use in the continuous, cyclic process. Thus, in the embodiment illustrated in FIG. 1, and as described more fully hereinafter in connection with the particular system shown in FIG. 2, the countersolvent streams 21 and 41, the DCB-containing streams 29 and 45, the water stream 34, and a portion of the aromatic product stream 27 may all be recycled for further use in the cyclic separation process.

The process of the present invention may also be carried out in accordance with various alternative embodiments employing, as the extracting agent therein, the DCB solvent and, preferably, a suitable countersolvent. In one such embodiment, which is particularly useful for separating feed stocks containing relatively high aromatic fractions (e.g., about 75% or higher), the sequential extraction and distillation operations 13 and 19 (FIG. 1) are reversed. Thus, the initial feed stock may be scrubbed with a DCB solvent stream within a combined absorber-stripper column wherein the first distillation operation is effected.

The non-aromatic constituents, containing a small fraction of the DCB and aromatic materials, are passed overhead from such distillation or absorption-stripping operation as a first phase. After condensation, such phase is contacted with a further portion of the DCB solvent and is subjected to a first extraction operation. The non-aromatics are thus separated, leaving a DCB phase containing the aromatic fractions remaining in the overhead (abolt 10% of the total aromatics) after the initial distillation.

The solvent stream fed into the initial distillation stage selectively absorbs about 90% of the more soluble, heavier aromatic components in the bottoms stream from such column. The resulting fat solvent stream may be stripped by a second distillation operation, similar to that described in connection with the preferred embodiment hereof, to separate and recover separate aromatic and DCB product streams.

When a countersolvent is employed in the preceding operations, it will be understood that such may be separated and recovered by a further distillation such as described hereinabove in connection with the preferred embodiment of the invention. The modified embodiment described may, however, be particularly useful in separating feed stocks containing large proportions of aromatic constituents, which constituents may readily be separated in high purity by directly scrubbing the mixtures containing the same with the DCB solvent and distilling the mixture to effect a direct combined absorption-stripping operation.

It may also be desirable to carry out the last mentioned modification of the invention under conditions designed to utilize phase separation in the initial fractionation stage, and to thus effect extractive strippng rather than extractive distillation of the non-aromatic fractions therein. In such an extractive stripping operation two liquids are present, a solvent and a solute. Since the ratio of these materials present in the vapor phase is an inherent function of their respective vapor pressures it is neither necessary nor possible, as in extractive distillation, to reduce the volatility of the solvent by increasing the number of trays or conducting the unit operation under reflux. Accordingly, the reflux may be omitted and the number of trays substantially reduced, the solvent remaining in the overhead product from the extractive stripping zone being separated from the primary non-aromatic constituents thereof by a water wash (as in the principal form of the invention) rather than by extraction with further solvent as noted above. The overhead product is condensed and then passed through such a wash column, the non-aromatics being readily separated from the water-DCB phase, and the latter being removed as bottoms from the column. The water-DCB phase may thereafter be fractionated, either by distillation or extraction (with an aromatic solvent).

Referring again to the preferred embodiment of the invention illustrated in FIG. 1 of the drawings, when higher boiling hydrocarbons such as occur in the kerosene range are being separated into aromatic rich and lean portions, such may be conveniently performed with a water washing of the aromatic stream 27 and a water washing of a slip stream from the solvent fraction 29. This last step would replace distillation zone 30. Such water washings could be performed separately or preferably combined in one column such as in zone 43 where the raffinate water wash 35 is introduced. The DCB solvent is then recovered from stream 34 by distillation through a column in which the water is removed in the overhead and the DCB in the bottoms. The latter is recycled to extraction zone 13 via 12, whereas the former is introduced into extraction zone 31.

Whereas an aromatics rich product substantially free of DCB may be obtained in line 27, in the case of wider boiling feedstocks containing heavier aromatics not all of the aromatics are readily separated from such solvent in the bottoms from the second distillation zone 25. As an alternate method to the water extraction described earlier, these aromatics may be removed from the solvent in zone 25 by introducing at the bottom of the distillation column a stream of light aromatics, preferably obtained by fractionation of the aromatics stream 27, or as a side stream from the extractive still 19. Alternatively, a stream of higher boiling non-aromatics may be obtained by flashing or fractionating the raffinate 17, which stream may then be introduced as a stripping agent at the base of the second distillation zone 25 to assist in stripping out the heavier aromatics. In the last case mentioned, the aromatics may then be separated from the heavy non-aromatics as an overhead in a separate distillation zone.

As discussed hereinabove, any DCB is removed from the non-aromatic raffinate formed in accordance with the preferred embodiment of the present invention by a water-wash, the DCB in the aqueous phase 35 subsequently being recoverable by a further extraction 43 with an aromatic medium. Alternatively, the DCB-aqueous phase may be fed to a separate distillation zone for separation of the DCB solvent from the water constituent thereof.

Alternatively, employing hydrocarbon feed stock incorporating kerosene-aromatics, it may be desirable to recover the DCB solvent from the raffinate water wash by contacting the same with the initial feed stock, rather than proceeding by the techniques described above. In such instance, the raffinate water wash 35 is countercurrently contacted in a pre-wash column with the initial hydrocarbon feed mixture 11, the latter selectively extracting the DCB from the aqueous wash stream. The feed/DCB mixture thus formed may be removed overhead through such a column, the bottoms from the column constituting a substantially pure water stream. The feed stock, containing some DCB, may then be fed into the first extraction zone 13 for separation of the extract and raffinate phases as described hereinabove.

The several alternative embodiments of the invention described herein effect the selective separation of predetermined hydrocarbon fractions in varying feed mixtures, employing the sequential extraction, distillation and stripping operations described, utilizing DCB and, preferably, a suitable countersolvent, as the extracting agent therein. As previously noted, the invention is particularly useful for separating hydrocarbon mixtures, including those having relatively narrow boiling ranges, containing both aromatic and non-aromatic hydrocarbons. In such embodiments, the hydrocarbon feed streams may suitably comprise feed stocks boiling in the gasoline or naptha range, that is below about 250° C., and containing at least 40% saturated hydrocarbons. Such mixtures may contain unsaturated hydrocarbons in amounts of 20% or less.

It is, however, also within the purview of the invention to employ as feed stocks to be separated fractions which have been pre-treated to facilitate improved separation. Hence, unsaturated cracked fractions to be separated in accordance with the present invention may, if desired, previously be selectively hydrogenated, as described, for example, in Voetter et al. Pat. No. 3,316,318, granted Apr. 25, 1967, prior to treatment by the selective separation technique hereof.

In general, components of a solution whose boiling points differ by less than about 30° C., are difficult to separate by simple distillation techniques. However, by means of the sequential extraction, distillation and stripping operations of the present process it is possible to separate, for example, benzene from mixtures thereof with cyclohexane, cyclohexene, n-heptane, 2,2,4-trimethylpentane and/or 2,4,4-trimethylpentene; toluene from mixtures thereof with 2,2,4-trimethylpentane, 2,4,4-trimethylpentene, n-octane, octene-1, octene-2, ethylcyclohexane, 2,6-octadiene, vinylcyclohexene, 1,3,7-octatriene, and/or 1,3,6-octatriene; or o-, m- or p-xylene from mixtures thereof with cyclooctane, 1,5-cyclooctadiene, and/or cyclooctene.

Other aromatic hydrocarbons which may be separated from non-aromatic fractions by the technique of this invention include alkyl-substituted benzenes such as toluene, xylene, trimethylbenzene, tetramethylbenzene, ethylbenzene, n-propylbenzene, cumene, and ethyl toluene; aryl-substituted benzenes, such as diphenyl; aromatic condensed ring hydrocarbons such as naphthalene, alkyl naphthalenes, e.g., methyl naphthalene, dimethyl naphthalene and ethyl naphthalene, and other naphthalene derivatives such as phenyl naphthalene, acenaphthene, etc.

Non-aromatic hydrocarbons from which the noted aromatic hydrocarbons may be separated in accordance herewith include saturated aliphatic hydrocarbons, such as hexane, heptane, octane, nonane, dodecane, tetradecane, isopentane, 2-ethylhexane, 2,2,3-trimethylbutane, 2,4-dimethylpentane, 2,3-dimethylpentane, and 2,2,4-trimethylpentane; unsaturated aliphatic hydrocarbons including monoolefins such as hexene-1, hexene-2, 2-ethylbutene-1, 2-methylpentene-1, 2-methylpentene-2, 4-methylpentene-1, octene-1, and 2,4,4-trimethylpentene-2, diolefins such as 1,5-hexadiene and 2,6-octadiene, and triolefins such as 1,3,7-octatriene and 1,3,6-octatriene; saturated cycloaliphatic hydrocarbons such as cyclohexane, methyl cyclopentane, and cyclooctane; unsaturated cycloaliphatic hydrocarbons including cyclomonoolefins such as cyclohexene and cyclooctene, and cyclodiolefins such as cyclohexadiene and cyclooctadiene.

In the course of certain refining operations, mixtures of a number of the above-noted aromatic and non-aromatic hydrocarbons are obtained. Such mixtures include crude petroleum, petroleum cracked oil, petroleum reformed oil, coal hydro-cracked oil, coal carbonized oil, etc. It is highly desirably and commercially valuable to be able to readily and efficiently recover the aromatic components of such mixtures. The present process provides a simple, efficient, and continuous method of treating the same to recover essentially all of the aromatic components, substantially free from the non-aromatics, therefrom.

It should also be noted that it is possible to employ the process of this invention for separations other than the separation of aromatic from non-aromatic hydrocarbons. Thus, for example, the process may be utilized to separate non-aromatic hydrocarbons of varying degrees of saturation, wherein each of the hydrocarbons contains at least about 4 carbon atoms and preferably from about 6 to 18 carbon atoms. Such separations include, for example, butenes from butane; hexene-1 and hexene-2 from hexane; cyclohexene from cyclohexane or hexane; heptenes from heptanes; butadiene from butenes and butanes; pentadienes and isoprenes from pentenes and pentanes; octatrienes from octadienes, octenes or octane; vinylcyclohexene from dimethylcyclohexane or ethylcyclohexane; cyclopentadiene from cyclopentenes, pentenes or cyclopentane; cyclooctatrienes from cyclooctadiene; cyclooctane from octane; dodecenes from dodecane; pentadecene from pentadecane; and the like. It should be observed that the non-aromatic hydrocarbons thus separable encompass separable aliphatic and cycloaliphatic hydrocarbons, including such aliphatic hydrocarbons as alkanes, monoolefins, diolefins, etc.

PREFERRED EMBODIMENTS OF THE INVENTION

The preferred form of the process of the present invention, for separating aromatic hydrocarbon fractions from feed stocks additionally incorporating non-aromatic constituents, makes use of a combined extraction agent incorporating the DCB solvent and a suitable countersolvent. Such materials are employed in the sequential operations illustrated in FIGS. 1 and 2 of the drawings, discussed more fully hereinafter.

The DCB solvent (which may also be termed 2-methyl glutaronitrile) is readily obtained by the catalytic hydrogenation of 2-methylene glutaronitrile, the latter being produced by the dimerization of acrylonitrile in the manner described, for example, in U.S. patent application Ser. No. 271,463, filed on Apr. 8, 1963, and owned by the assignee of the present invention. The hydrogenation of the 2-methylene glutaronitrile may be carried out by introducing a palladium on carbon catalyst into a stirred reactor along with the 2-methylene glutaronitrile, employing about 0.1 to 5% of the catalyst, based on the amount of 2-methylene glutaronitrile reacted. Hydrogen is then added while stirring the reaction mixture under pressures of from about 2 to 136 atm., preferably from about 14 to 68 atm., and at temperatures of from about 20° to 80° C., preferably from about 40° to 70° C. The reaction is continued until the required amount of hydrogen is absorbed, after which the DCB product is filtered to remove the solid catalyst particles therefrom, the resulting solvent then being ready for use.

The countersolvent employed in conjunction with the DCB solvent partially dissolves in the DCB-aromatic fraction extract formed in accordance with the invention, thereby reducing the solubility therein of the higher boiling, non-aromatic constituent of the feed extracted. The countersolvent thus increases the selective extraction of the aromatic materials which is partially effected by the DCB solvent.

Those materials which may be used as countersolvents in the present process are liquid non-aromatic saturated hydrocarbons boiling below about 95° C., and preferably below about 80° C. The countersolvent to be employed for a particular separation is chosen such that its boiling point is so remove from the boiling range of the mixture of aromatics and DCB separated during the process as to facilitate separation of the countersolvent from such mixture by distillation operations. Materials so useful include the liquid saturated hydrocarbons containing up to about 7 carbon atoms, e.g., hexane, isohexane, cyclohexane, methylcyclohexane, methylcyclopentane, cyclopentane, pentane, heptane, isoheptane, or mixtures of two or more of such materials.

If desired, the feed stock to be treated by the present process may be subjected to an initial fractionation and a portion of the light-saturated naphtha fraction thus produced employed as a countersolvent as described, for example, in Shiras U.S. Pat. No. 2,921,015, granted Jan. 12, 1960. Alternatively, and as indicated hereinafter, the light hydrocarbon stream stripped from the DCB-aromatics extract formed in the preferred embodiment of the invention described hereinafter, and containing a small amount of aromatics up to about 10% benzene, may be employed as the countersolvent without adverse effect.

A light hydrocarbon countersolvent may also be provided by distillation of the water washed raffinate produced in the second extraction zone 31 of the preferred embodiment hereof. When such a solvent is employed, the extract from zone 13 may be further extracted with an excess of the countersolvent (in lieu of distillation within zone 25) to separate a substantially solvent-free hydrocarbon phase from a heavier DCB phase. The aromatics are subsequently separated from such hydrocarbon phase by distillation. The non-aromatic containing raffinate is subjected to the water wash treatment to separate DCB present therein from the non-aromatics and the water-washed hydrocarbon mixture is thereafter distilled, as indicated hereinabove, to provide the desired light hydrocarbon countersolvent.

In accordance with such technique, successive water washes are employed to separate the minor amounts of DCB solvent from the hydrocarbon solvent, the water-DCB mixtures thus resulting subsequently being fractionated by distillation to recover the small amounts DCB for recycle. Employing such techniques, it is thus not necessary to separate the bulk of the DCB solvent from any hydrocarbon constituents by direct distillation operations.

Turning to the preferred form of the process of the invention, as shown in FIG. 2, a hydrocarbon feed stock 11 and a DCB solvent feed 12 are initially countercurrently flowed through the first extraction zone 13. The hydrocarbon feed stock may suitably be fed into the lower section of such zone, while the DCB feed is introduced near the top of the zone and, concurrently therewith, a countersolvent (suitably n-hexane) feed stream 14 is fed into the base of the extractor.

The relative flow rates of the DCB and countersolvent contacted with the hydrocarbon feed stock within the first extraction zone 13 are suitably regulated to extract at least a major portion of the aromatic constituent of the feed stock while simultaneously decreasing the solubility of the less volatile non-aromatic fractions in such extract so as to displace such fractions therefrom. In some cases, the DCB and countersolvent may be employed in substantial excess, particularly when it is desired to extract the last traces of the aromatic constituents from the feed. The optimum relative proportions of the several feed streams may vary, depending upon the aromatics content of the feed material, the temperatures and pressures at which the extraction is conducted, the particular type of extractor employed, and the degree of ultimate separation desired. Generally, ranges of from about ½ to 10 volumes of DCB per volume of feed material, and preferably from about 2 to 7 volumes of DCB per volume of feed stock may be employed. Concurrently, from about 1/50 to ¼ volume of countersolvent per volume of DCB solvent may suitably be fed into the extraction zone. Thus, for example, when it is desired to remove all of the aromatic fraction from a feed stock having an initial aromatic content of 35%, while effecting the initial extraction at room temperature, and in the presence of an n-hexane countersolvent, at least 3 volumes of DCB and ⅙ volume of the countersolvent are contacted per volume of feed stock treated.

The first extraction zone may be provided by any conventional extraction equipment, such as, for example, a single agitated column containing a single stage or extraction zone, in which the DCB, countersolvent and feed stock mixtures are mixed and allowed to settle. Alternatively, a multistage extractor may be employed, containing a plurality of mixing-settling stages, each of which functions in a manner similar to that of the single agitated vessel.

A rotating disc contactor may be utilized as a suitable multistage extractor. Such a device consists of three sections, of which the top and bottom are small settling compartments, and the intermediate section constitutes the countercurrent extraction zone wherein the vessel is divided into short individual compartments by a series of horizontal, stationary rings. In each such compartment, a rotor disc is mounted on a centrally mounted rotating shaft which is positioned parallel to the sides of the contactor, so that each disc is midway between the adjacent rings. A complete description of a rotary disc contactor suitable for use herein is set out in Reman U.S. Pat. No. 2,601,674, granted June 24, 1952.

Other conventional countercurrent multistage extraction equipment may, however, similarly be employed, for instance, extraction columns containing packing material, baffles or sieve plates. Especially suitable is a York-Scheibel column.

Where the first extraction zone comprises a multistage extraction column, it may contain anywhere from about 3 to 100 stages and preferably from about 10 to 20 stages, depending upon the composition of the mixture to be separated, the countersolvent employed, the solvent to feed ratios, the temperature employed and the desired degree of separation, as will be apparent to those skilled in the art. In the embodiment illustrated in FIG. 2, the first extraction zone 13 may conveniently constitute a rotating disc contactor column, having 20 stages or plates, the feed 11 being introduced at about the sixth stage, the DCB stream 12 being introduced at the 20th stage, and the hexane countersolvent stream 14 being introduced at the first stage.

The extraction carried out in zone 13 may be effected at temperatures in the range of from about the ambient temperatures to 170° C. For most purposes it is preferred to operate at temperatures substantially below the boiling point of the DCB, viz., 275° C. When employing DCB plus an n-hexane countersolvent at substantially atmospheric pressure to effect the separation of benzene from $C_6$ non-aromatic hydrocarbons, temperatures ranging from about 15° to about 90° C. have been found satisfactory. Additionally, it is preferred to carry out the extraction in zone 13 under substantially atmospheric pressure, although superatmospheric pressures may be employed.

The aromatic hydrocarbons present in the feed mixture are substantially extracted therefrom in zone 13 by the DCB solvent, which forms an initial extract phase 15 incorporating the DCB, the bulk of the aromatic constituents, and a portion of the non-aromatic fraction of the initial feed mixture. Upon contact of such phase with the countersolvent, the latter decreases the solubility of the higher-boiling non-aromatic materials in the DCB, resulting in the formation of an extract phase containing all of the aromatic fraction, substantially all of the DCB solvent, the bulk of the countersolvent, and small amounts of the more volatile non-aromatic constituents. The residual raffinate 17 thus contains substantially all of the non-aromatics, and minor proportions of the DCB and countersolvent materials. The extract phase 15 emerges from the bottom of zone 13 and is introduced into a first distillation zone 19, suitably containing 10 stages. The aromatic-stripped raffinate phase 17 emerges from the top of the first extraction zone for further processing.

The countersolvent and any volatile non-aromatics present in the extract phase are separated from the DCB and aromatic fractions within the first distillation zone 19. Where the countersolvent boils at a temperature less than the mixture of the DCB and aromatic constituents, the former is recovered as the distillate, the mixture of the DCB and aromatics being recovered as still bottoms.

Any conventional distillation apparatus may be employed in the first distillation zone 19. In order to obtain a satisfactory separation, the apparatus should operate at a countersolvent reflux ratio within the range of from about 1:1 to 40:1, and preferably from about 5:1 to 20:1. Depending upon the boiling points of the countersolvent and the mixture of the DCB and aromatics, and the degree of separation desired, the distillation apparatus may contain from about 5 to 100 stages, and preferably from about 10 to 50 stages. In the particular system illustrated in FIG. 2, zone 19 may conveniently be operated at a distillate reflux ratio of 20:1, the distillate being removed at a temperature of about 69° C.

Desirably, the extractive distillation in zone 19 may be enhanced by the introduction of fresh DCB (which may, as shown, be provided in whole or in part by recycle) through a feed line 16. The fresh solvent thus added promotes further separation of any non-aromatic residuals from the DCB-aromatic mixture. The amount of DCB thus recycled, as well as the countersolvent reflux ratio referred to hereinabove, is a function of the hydrocarbon feed composition, the choice of the countersolvent, and the type of distillation apparatus employed, as will be apparent to those having ordinary skill in the art. The amount of fresh solvent thus fed into distillation zone 19 may thus range from about 0 to 50% of the extract subjected to the extractive distillation, preferably from about 5% to 30% thereof.

The countersolvent and any lower boiling non-aromatics are thus passed overhead in distillate stream 21 into line 14 and thence returned to the first extraction zone 13. Make-up countersolvent 20 is additionally fed into line 14 for extraction within zone 13. The still bottoms, comprising a mixture of the aromatic fractions and DCB, are removed as stream 23.

The temperature of the DCB-aromatics stream leaving the first distillation zone 19 is fixed by the composition of the mixture distilled and the reflux ratio within such zone, and is generally within the range of from about 130° to 210° C., preferably from about 160° to 190° C. The overhead temperature may be up to about 170° C. Finally, the extractive still may operate at pressures of from about 0.1 to 5 atm.

The aromatic fraction is separated from the DCB in a second distillation or stripping zone 25 maintained at atmospheric pressure, steam or vacuum distillation not being required since DCB is stable at its atmospheric boiling point. Apparatus similar to that employed in the first distillation zone 19 may be employed in the second distillation zone, although the number of stages will have to be adjusted, depending upon the composition of the aromatic fraction stripped therein and the amount of DCB entering the distillation apparatus. This zone should operate at a reflux ratio of from about 1:1 to 10:1, and preferably from about 2:1 to 5:1.

If desired, the extractive distillation and stripping operations carried out in the first and second distillation zones 19 and 25 hereof may rather be effected within a single distillation zone so arranged as to achieve the plural separations and facilitate removal of a substantially pure DCB stream as a bottoms product. Such a combined operation may be carried out in a distillation column fitted with at least one draw-off tray situated below the points of introduction of the DCB extract and being pervious to gas and impervious to liquid. Liquid accumulated on such draw-off tray is withdrawn therefrom and recycled into the section of the extractive distillation zone at least one theoretical stage below the draw-off tray. By introducing a second liquid stream into the extractive distillation zone between the draw-off tray and the lower portion of such zone, and withdrawing a vapor side stream from the lower portion of such zone at a point below the draw-off tray and above the point of introduction of either liquid feed stream, the combined extractive distillation and stripping operations carried out in zones 19 and 25 may be performed within a single distillation column.

The use of a combined "extract stripper" operation such as described hereinagove is of particular interest in the treatment of catalytic reformates for octane improvement. In such instance, the stabilized reformate is initially passed through the extraction zone, from which the fat solvent may be flashed prior to being fed to the stripping zone. The light hydrocarbons recovered in the overhead from the flashing operation may then be recycled to the extraction system as countersolvent. The aromatics-containing liquid remaining after flashing is thereafter charged to the "extract stripper" wherein hydrocarbons are stripped from the DCB solvent, and a hydrocarbon reflux removes the solvent from the overhead vapors. The aromatics-rich overhead vapors may thereafter be condensed, washed and recovered, while the lean solvent remaining after stripping may be cooled and returned to the extraction system.

Where, however, a separate distillation or stripping zone 25 is employed, as illustrated in FIG. 2, the aromatic fraction recovered is taken off overhead as stream 27, while the DCB solvent is removed as bottoms stream 29. A portion of the aromatics is withdrawn through a product line 28, the remaining portion being fed into the third extraction zone discussed below. A portion of the DCB solvent may be recycled to the first distillation zone 19 through line 16, or the entire solvent stream may be recycled through line 12 to the first extraction zone 13. Alternatively, and if desired, a portion of the DCB removed from the distillation zone as stream 29 may be passed to a fourth distillation zone 30 for separation of any tars present therein. The thus purified DCB may be recovered and incorporated in the DCB feed steam 12, the tars being removed as bottoms 32 and discarded.

The raffinate 17 emerging from extraction zone 13 is passed through a second extraction or water wash zone 31 to separate the DCB solvent remaining therein from the countersolvent and non-aromatic fractions thereof. The DCB contained in the raffinatt is extracted with a water-wash stream 34, the non-aromatics and small amounts of countersolvent remaining in the raffinate being passed overhead as stream 33 and the aqueous DCB-containing stream being removed as bottoms 35.

The second extraction may be carried out in any conventional extraction column. Depending upon the composition of the raffinate phase entering such zone, the water:raffinate ratio, the temperature employed, and the degree of separation desired, multi-stage extraction columns containing from about 2 to 20 stages and, preferably, from about 3 to 10 stages can be employed. The DCB, which is more soluble in water than in the non-aromatic fractions, is extracted from the raffinate phase in this zone at ambient or elevated temperatures, suitably at temperatures within the range of from about 10° to 100° C. and, preferably, from about 20° to 80°. The amount of water used in the wash can broadly range from about ½% to 100% of the raffinate stream and, preferably, from about 1% to 10% thereof.

If desired, the small amounts of countersolvent recovered with the non-aromatic fraction in the overhead 33 from the second extraction zone may be separated within a third distillation zone 37. The non-aromatics may thus be recovered as a bottoms stream 41, the countersolvent being removed as an overhead stream 39 and, suitably, recycled to extraction zone 13.

In the preferred embodiment hereof, a third extraction zone 43 is thereafter utilized to separate the DCB solvent from admixture with water in the wash extract recovered from the second extraction zone 31. Such extraction is suitably carried out employing a portion of the aromatic stream 27 recovered from the prior distillation zone 25 as the extractant, such stream being fed through line 44 into the extraction zone. Since the DCB possesses greater solubility in the aromatic phase than in the water phase, it dissolves in the former to effect the desired phase separation.

The third extraction zone 43 may, like the prior stages, be provided by any conventional single or multi-stage extraction column. Thus, depending upon the compositions of the aromatic extractant and the water-DCB mixture, the temperatures employed for the extraction and the degree of separation desired, the use of multi-stage extractors having from about 1 to 20 stages and preferably, from about 3 to 10 stages, is suitable. In order to insure substantially complete separation of the DCB from the aqueous phase, the proportions of the aromatic stream to the DCB-water stream can be within the range of from about 0.3:1 to 20:1, preferably from about 1:1 to 5:1. The extraction zone 43 is concurrently maintained at temperatures within the range of from about 0° to 120° C., preferably from about 20° to 80° C.

The third extraction zone, like second extraction zone 31, is desirably maintained under atmospheric pressure. When, however, the extraction temperatures in such zones are higher than those indicated hereinabove, it may be necessary to employ superatmospheric pressures to prevent boiling of the water and low boiling components present in the raffinate 17 and the aromatic stream 44 introduced into the respective zones.

The DCB-containing aromatic phase recovered from the third extraction zone 43 is suitably recycled, as stream 45, to the second distillation zone 25. The DCB and aromatic fractions are separated in such zone as described hereinabove, and the individual constituents recovered or recycled as indicated. The water phase is removed as stream 34 from the bottom of extraction zone 43 and is recycled to provide the water-wash within the second extraction zone 31.

Various modifications in the temperatures and pressures maintained in the sequential treatment zones 13, 19 and 25 may be made to improve the purity of the aromatic fractions recovered by the sequential operations of the present process.

The following examples further illustrate particularly desirable modes of carrying out the hereinabove described preferred embodiments of the process of the present invention:

EXAMPLE 1

Separation of feed stocks, employing DCB and n-hexane extracting agent

A hydrocarbon feed stock was separated into its aromatic and non-aromatic fractions, employing the sequential extraction/distillation system illustrated in FIG. 2, discussed above. The specific apparatus employed to carry out the reaction included a York Scheibel extraction column containing 20 stages (the first extraction zone 13), a 2-inch diameter distillation column containing about 25 theoretical plates, within which a 20:1 reflux ratio was maintained (the first distillation zone 19), two further York Scheibel extractor columns, each of which had five stages (the 2nd and 3rd extraction zones 31 and 43, respectively), and a 2-inch diameter distillation column containing 10 stages, within which a 3:1 reflux ratio was maintained (the 2nd distillation zone 25).

The extract phase removed from the first extraction zone 13 was fed into the first distillation zone 19, maintained at a temperature of about 128° C., the additional DCB stream 16 fed into such zone concurrently being maintained at a temperature of about 87° C. The DCB-aromatic stream 23 removed from such zone was recovered at a temperature of 170° C., while the countersolvent was removed overhead as stream 21 at a temperature of 69° C. The DCB removed as bottoms 29 from the second distillation zone 25 was recovered at a temperature of 271° C., while the aromatic fraction removed overhead as stream 27 was recovered at a temperature of 140° C. Finally, the fourth distillation zone 37 was operated at a reflux temperature of 275° C., while the tars removed and discarded as stream 32 were at a temperature of 300° C.

The compositions of the several reactant and product streams employed in the practice of this example are set forth in the following table, the stream compositions at each point in the process being identified by the numbered stages of the accompanying flow sheet defining FIG. 2 of the drawings.

TABLE I.—SEPARATION OF AROMATIC FROM ALIPHATIC FRACTIONS OF PETROLEUM FEED STOCK, EMPLOYING DCB SELECTIVE EXTRACTANT AND HEXANE COUNTERSOLVENT

| Stream No. (Fig. 2) | DCB | Aliphatics | Hexane countersolvent | Aromatics | Water | Tar |
|---|---|---|---|---|---|---|
| 11 | 0 | 65 | 0 | 35 | 0 | 0.1 |
| 12 | 300 | 0 | 0 | 0 | 0 | 0 |
| 14 | 0 | 0 | 17 | 0 | 0 | 0 |
| 15 | 299 | 0 | 13 | 35 | 0 | 0.1 |
| 17 | 0.2 | 65 | 4 | 0 | 0 | 0 |
| 20 | 0 | 0 | 4 | 0 | 0 | 0 |
| 21 | 0 | 0 | 13 | 0 | 0 | 0 |
| 16 | 86 | 0 | 0 | 0 | 0 | 0.1 |
| 23 | 385 | 0 | 0 | 35 | 0 | 0.1 |
| 27 | 0 | 0 | 0 | 38 | 0 | 0 |
| 29 | 386 | 0 | 0 | 0 | 0 | 0.1 |
| 28 | 0 | 0 | 0 | 35 | 0 | 0 |
| 32 | 0 | 0 | 0 | 0 | 0 | 0.1 |
| 34 | 0 | 0 | 0 | 0 | 1.1 | 0 |
| 33 | 0 | 65 | 4 | 0 | 0.1 | 0 |
| 35 | 0.2 | 0.1 | 0 | 0 | 1.0 | 0 |
| 44 | 0 | 0 | 0 | 3 | 0 | 0 |
| 45 | 0.2 | 0 | 0 | 3 | 0 | 0 |

EXAMPLE 2

Separation of feed stocks, employing DCB and benzene/n-heptane extracting agent 100 parts of a hydrocarbon feed mixture containing 63.8 parts non-aromatics, 6.3 parts benzene, 14.1 parts toluene, 12.9 parts $C_8$ aromatics, and 4.1 parts $C_9$ aromatics was fed into the sixth stage of a one-inch diameter York-Scheibel extraction column at a rate of 9 ml./min. 36 ml./min. of DCB was fed into the top (21st) stage, and a countersolvent comprising 7% benzene in n-heptane was fed at a rate of 3 ml./min. into the 1st stage of the extraction column. The hydrocarbon feed mixture was countercurrently contacted, at 26° C., with the DCB and the countersolvent to selectively dissolve the aromatics therein and form an extract which emerged from the extraction column at a rate of 39 ml./min. A raffinate phase emerged from the extraction column at a rate of 8.2 ml./min.

25 ml./min. of the extract at a temperature of 149° C. and 6.7 ml./min. of fresh DCB at a temperature of 94° C. were fed into the bottom third of a 2-inch diameter distillation column which operated at a reflux ratio of 10:1. Distillate consisting essentially of n-heptane at a temperature of 83° C. was recovered along with still bottoms at a temperature of 194° C. The volume ratio of bottoms:distillate recovered was about 26. The distillate contained about 30% benzene.

The still bottoms was fed to a second 2-inch diameter distillation column containing 25 theoretical plates, and was distilled at atmospheric pressure. The volume ratio of bottoms (mostly DCB):distillate recovered was about 5.2. The distillate was recovered and fractionally distilled at temperatures ranging from about 56° to about 164° C.

The compositions of the fractional distillates thus obtained, and the percentages distilled throughout the temperature range, are set out in Table II below:

TABLE II.—DISTILLATION OF AROMATIC FRACTION SEPARATED FROM HYDROCARBON FEED STOCK EMPLOYING DCB SOLVENT AND BENZENE/n-HEPTANE COUNTERSOLVENT

| Temp., °C. | Percent distilled | Non-aromatics | Benzene | Toluene | $C_8$ | $C_9$ |
|---|---|---|---|---|---|---|
| 56 | 0.7 | 82 | 0 | 18 | | |
| 108 | 0.4 | 19 | 0 | 81 | | |
| 111 | 0.7 | 2.5 | 0 | 97.5 | | |
| 111 | 3.7 | 0.2 | 0 | 99.8 | | |
| 111 | 18 | 0 | 0 | 100 | | |
| 111 | 5.8 | 0 | 0 | 100 | | |
| 111 | 7.3 | 0 | 0 | 100 | | |
| 111 | 6.1 | 0 | 0 | 60 | 40 | |
| 139 | 2.5 | 0 | 0 | 3.7 | 96.7 | |
| 139 | 18.7 | 0 | 0 | 0 | 100 | |
| 141 | 6.6 | 0 | 0 | 0 | 100 | |
| 144 | 4.2 | 0 | 0 | 0 | 100 | |
| 150 | 1.1 | 0.3 | 0 | 0 | 99.7 | |
| 159 | 7.4 | 0 | 0 | 0 | 2 | 98 |
| 163 | 2.4 | 0 | 0 | 0 | 0 | 100 |
| 164 | [1]14.7 | 0 | 0 | 0 | 0 | 12 |

[1] Residue.

In a run wherein no countersolvent was employed, 100 parts of a hydrocarbon feed mixture containing 63.8 parts non-aromatics, 6.3 parts benzene, 14.1 parts toluene, 12.9 parts $C_8$ aromatics, and 4.1 parts $C_9$ aromatics was fed into a one-inch diameter York-Scheibel extraction column at a rate of 9 ml./min. 36 ml./min. of DCB was also fed into the column and countercurrently contacted at 27° C. with the feed stock to selectively dissolve the aromatics therein and form an extract which emerged from the extraction column at a rate of 42 ml./min. A raffinate phase emerged from the extraction column at a rate of 6.3 ml./min.

26 ml./min. of the extract at a temperature of 145° C. and 5 ml./min. of fresh DCB at a temperature of 89° C. were fed into a 25-plate 2-inch diameter distillation column which operated at a reflux ratio of 10:1. The mixture was distilled at a tempearture of about 145° C. and a distillate consisting essentially of countersolvent at a temperature of 65° C. was recovered along with still bottoms at a temperature of 192° C. The volume ratio of bottoms:distillate recovered was about 25:1. The distillate contained about 19% benzene.

The still bottoms were fed to a second distillation column 2 inches in diameter containing 10 plates, and were distilled at atmospheric pressure at a temperature of about 204° C. The volume ratio of bottoms (mostly DCB:distillate) recovered was about 6:1. The distillate, at a temperature of about 148° C., was recovered and fractionally distilled at temperatures ranging from about 80° to about 159° C.

The compositions of the fractional distillates thus obtained, and the percentages distilled throughout the temperature range are set forth in Table III below:

TABLE III.—DISTILLATION OF AROMATIC FRACTION SEPARATED FROM HYDROCARBON FEED STOCK EMPLOYING DCB SOLVENT WITHOUT COUNTERSOLVENT

| Temp., °C. | Percent distilled | Composition of distillates | | | | |
|---|---|---|---|---|---|---|
| | | Non-aromatics | Benzene | Toluene | Aromatics $C_8$ | $C_9$ |
| 80 | 3 | 1.2 | 98.8 | | | |
| 80 | 1.2 | 5 | 75 | 20 | | |
| 106 | 0.6 | 14 | 14 | 72 | | |
| 111 | 15 | 5 | 0 | 95 | | |
| 111 | 4 | 3.3 | 0 | 96.7 | | |
| 112 | 10 | 18 | 0 | 66 | 16 | |
| 132 | 15 | 6 | 0 | 0 | 94 | |
| 137 | 12 | 3.3 | 0 | 0 | 96.7 | |
| 141 | 3 | 6 | 0 | 0 | 94 | |
| 151 | 5 | 6 | 0 | 0 | | 94 |
| 159 | ¹31 | 2 | 0 | 0 | | 98 |

¹ Residue.

From the data in Tables II and III, it is clearly seen that where a countersolvent was employed in addition to the DCB selective extractant in the sequential extraction-distillation of the instant invention, a substantially complete separation of the aromatic from the non-aromatic fractions of a petroleum feed stock was achieved. However, where no countersolvent was employed, the separation of the non-aromatics from the aromatics was incomplete.

EXAMPLE 3

Separation of feed stocks, employing DCB and cyclohexane extracting agent 100 parts of a hydrocarbon feed mixture containing 63.8 parts non-aromatics, 6.3 parts benzene, 14.1 parts toluene, 12.9 parts $C_8$ aromatics, and 4.1 parts $C_9$ aromatics was fed into the 6th stage of a one-inch diameter York-Scheibel extraction column at a rate of 12 ml./min. 36 ml./min. DCB was fed into the last stage, that is the 21st stage, and a cyclohexane countersolvent was fed at a rate of 3.6 ml./min. into the first stage of the extraction column. The hydrocarbon feed mixture was countercurrently contacted at 27° C. with the DCB and the countersolvent to selectively dissolve the aromatics therein and form an extract which emerged from the extraction column at a rate of 42 ml./min. A raffinate phase emerged from the extraction column at a rate of 9.4 ml./min.

33 ml./min. of the extract at a temperature of 134° C. and 8.5 ml./min. of fresh DCB at a temperature of 88° C. were fed into a 25-plate, 2-inch diameter distillation column which operated at a reflux ratio of 10:1. The mixture was distilled at a temperature of about 134° C. and a distillate consisting essentially of countersolvent at a temperature of 73° C. was recovered along with still bottoms at a temperature of 180° C. The volume ratio of bottoms:distillate recovered was about 20. The distillate contained about 3.6% benzene.

The still bottoms were fed to a second distillation column and were distilled at atmospheric pressure at a temperature of about 178° C. The volume ratio of bottoms (primarily DCB):distillate recovered was about 7.5. The distillate, at a temperature of about 143° C., was recovered and fractionally distilled at temperatures ranging from about 77° to about 156° C.

The compositions of the fractional distillates thus obtained, and the percentages distilled throughout the temperature range are set forth in Table IV below:

TABLE IV.—DISTILLATION OF AROMATIC FRACTION SEPARATED FROM HYDROCARBON FEED STOCK EMPLOYING DCB SOLVENT AND CYCLOHEXANE COUNTERSOLVENT

| Temp., °C. | Percent distilled | Composition of distillates | | | | |
|---|---|---|---|---|---|---|
| | | Non-aromatics | Benzene | Toluene | Aromatics $C_8$ | $C_9$ |
| 77 | 2 | 50 | 50 | | | |
| 77 | 5 | 50 | 50 | | | |
| 78 | 2 | 32 | 68 | | | |
| 79 | 3 | 31 | 53 | 16 | | |
| 108 | 1 | 6.4 | 0.7 | 93 | | |
| 109 | 18 | 0.4 | 0 | 99.6 | | |
| 110 | 7 | 0.3 | 0 | 99.7 | | |
| 111 | 1 | 1.7 | 0 | 71 | 27 | |
| 132 | 2 | 1 | 0 | 10 | 89 | |
| 139 | 27 | 0 | 0 | 0 | 100 | |
| 150 | 1.5 | 0 | 0 | 0 | 58 | 47 |
| 156 | ¹30 | 0 | 0 | 0 | 0 | |

¹ Residue.

EXAMPLE 4

Separation of feed stocks employing DCB and isoheptane extracting agent 100 parts of a hydrocarbon feed mixture containing 63.8 parts non-aromatics, 6.3 parts benzene, 14.1 parts toluene, 12.9 parts $C_8$ aromatics, and 4.1 parts $C_9$ aromatics was fed into the 6th stage of a one-inch diameter York-Scheibel extraction column at a rate of 12 ml./min. 36 ml./min. of DCB was fed into the last stage, that is stage 21, and an isoheptane countersolvent was fed at a rate of 3 ml./min. into the first stage of the extraction column. The hydrocarbon feed mixture was countercurrently contacted at 77° C. with the DCB and the countersolvent to selectively dissolve the aromatics therein and form an extract which emerged from the extraction column at a rate of 42 ml./min. A raffinate phase emerged from the extraction column at a rate of 10 ml./min. 33 ml./min. of the extract at a temperature of 121° C. and 8.5 ml./min. of fresh DCB, at a temperature of 88° C., were fed into a 25-plate, 2-inch diameter distillation column which operated at a reflux ratio of 10.1. The mixture was distilled at a temperature of about 121° C. and a distillate consisting essentially of countersolvent at a temperature of 86° C. was recovered along with still bottoms at a temperature of 190° C. The volume ratio of bottoms:distillate recovered was about 30. The distillate contained about 11% benzene.

The still bottoms were fed to a second distillation column 2 inches in diameter containing 10 plates and were distilled at atmospheric pressure at a temperature of about 85° C. The volume ratio of bottoms (primarily DBC):distillate recovered was about 10.6. The distillate, at a temperature of about 205° C., was recovered and fractionally distilled at temperatures ranging from about 77° to about 158° C.

The compositions of the fractional distillate thus obtained and the percentages distilled throughout the temperature range are set forth in Table V below:

TABLE V.—DISTILLATION OF AROMATIC FRACTION SEPARATED FROM HYDROCARBON FEED STOCK EMPLOYING DCB SOLVENT AND ISOHEPTANE COUNTER SOLVENT

| Temp., °C. | Percent distilled | Non-aromatics | Composition of distillates | | | |
|---|---|---|---|---|---|---|
| | | | Aromatics | | | |
| | | | Benzene | Toluene | C$_8$ | C$_9$ |
| 77 | 1.4 | 7.5 | 92.5 | | | |
| 82 | 0.6 | 7.5 | 92.5 | | | |
| 85 | 1.7 | 18.6 | 72.4 | 8.9 | | |
| 110 | 1.1 | 7.5 | 3.2 | 89.3 | | |
| 112 | 22.2 | 0.1 | 0 | 99.9 | | |
| 111 | 6.4 | 0 | 0 | 78 | 22 | |
| 139 | 1.7 | 0 | 0 | 0.6 | 99.4 | |
| 141 | 17.3 | 0.2 | 0 | 0 | 99.8 | |
| 144 | 4.8 | 0 | 0 | 0 | 100 | |
| 145 | 6.9 | 0 | 0 | 0 | 100 | |
| 150 | 3.3 | 0 | 0 | 0 | 97 | 5 |
| 158 | ¹31 | 0 | 0 | 0 | 0 | 101 |

¹ Residue.

There is thus provided, in accordance with the present invention, an improved process for the separation and purification of pre-determined fractions of hydrocarbon feed stocks, preferably the aromatic constituents of such feeds. It will be understood that various changes may be made in the parameters of the preferred embodiments of the process described hereinabove without departing from the scope of the present invention. Accordingly, the preceding description is intended as illustrative only and not in a limiting sense.

What is claimed is:

1. A process for separating aromatic hydrocarbons from a mixture of aromatic and non-aromatic hydrocarbons, which comprises:
   (1) countercurrently contacting in an extraction zone a mixture of aromatic and non-aromatic hydrocarbons with liquid 1,3-dicyanobutane and with a countersolvent slightly soluble in 1,3-dicyanobutane and which reduces the solubility therein of non-aromatic hydrocarbons, to selectively dissolve the aromatics therein and form an extract phase comprising 1,3-dicyanobutane, aromatics and countersolvent, the undissolved non-aromatics thereby constituting a raffinate phase comprising non-aromatics, 1,3-dicyanobutane and a small amount of countersolvent;
   (2) separating the extract and raffinate;
   (3) passing the extract to a first distillation zone, and separating countersolvent substantially free of aromatic hydrocarbons from the extract by distillation, and
   (4) passing the 1,3-dicyanobutane and aromatics to a second distillation zone, and separating aromatics from the 1,3-dicyanobutane by distillation.

2. The process in accordance with claim 1, wherein at least a portion of the 1,3-dicyanobutane separated from the aromatics is recycled to the extraction zone.

3. The process in accordance with claim 1, wherein at least a portion of the 1,3-dicyanobutane separated from the aromatics is recycled to the first distillation zone.

4. The process in accordance with claim 1, wherein countersolvent is n-hexane.

5. The process in accordance with claim 1, wherein the countersolvent is a mixture of n-heptane and a small amount of benzene.

6. The process in accordance with claim 1, wherein the countersolvent is cyclohexane.

7. The process in accordance with claim 1, wherein the countersolvent is isoheptane.

8. The process in accordance with claim 1, wherein the aromatic hydrocarbon is benzene.

9. The process in accordance with claim 1, wherein the countersolvent separated from the extract in the first distillation zone is recycled for re-use in the extraction zone.

10. The process in accordance with claim 1, wherein additional portions of the 1,3-dicyanobutane are recovered for further use by the additional steps which comprise:
   (5) contacting the raffinate formed in step (1) with water in a second extraction zone to form an aqueous phase containing 1,3-dicyanobutane and water, and an organic phase containing said non-aromatic hydrocarbons and said countersolvent;
   (6) separating the aqueous phase from the organic phase;
   (7) contacting the aqueous phase with at least one aromatic hydrocarbon in which the 1,3-dicyanobutane is soluble in a third extraction zone to dissolve the 1,3-dicyanobutane therein to form an organic phase containing said aromatic hydrocarbon and the 1,3-dicyanobutane, and a water phase; and
   (8) separating the organic phase from the water phase and recovering the former for further use.

11. The process in accordance with claim 10, wherein additional portions of said countersolvent are recovered for further use by the additional step which comprises:
   (9) passing the organic phase formed in step (5) to a third distillation zone, and separating the non-aromatic hydrocarbon constituents thereof from said countersolvent by distillation.

References Cited

UNITED STATES PATENTS

| 2,407,820 | 9/1946 | Durrum | 260—674 |
| 2,433,751 | 12/1947 | Friedman | 208—330 |
| 2,441,827 | 5/1948 | McKinnis | 208—313 |
| 3,476,680 | 11/1969 | Coleman | 208—321 |

DELBERT E. GANTZ, Primary Examiner

C. E. SPRESSER, Jr., Assistant Examiner

U.S. Cl. X.R.

208—313, 321, 330